United States Patent
Beyda et al.

(10) Patent No.: US 6,556,666 B1
(45) Date of Patent: Apr. 29, 2003

(54) NOTIFICATION SYSTEM FOR MULTIMEDIA MESSAGING SYSTEMS

(75) Inventors: William Joseph Beyda, Cupertino, CA (US); Shmuel Shaffer, Palo Alto, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/073,099

(22) Filed: May 5, 1998

(51) Int. Cl.[7] .............................................. H04M 1/64
(52) U.S. Cl. ........................ 379/88.12; 379/88.13; 379/211.03
(58) Field of Search .......................... 379/88.08, 88.09, 379/88.11, 88.12, 88.13, 88.14, 88.15, 88.17, 88.18, 88.22, 88.23, 88.25, 88.27, 88.28, 93.24, 100.01, 201, 214, 201.01, 214.01, 211.01, 211.02, 211.03; 455/413

(56) References Cited

U.S. PATENT DOCUMENTS

| | | | |
|---|---|---|---|
| 5,138,653 A | | 8/1992 | Le Clercq |
| 5,177,780 A | | 1/1993 | Kasper et al. |
| 5,661,781 A | * | 8/1997 | DeJager ................... 379/88.12 |
| 5,742,905 A | * | 4/1998 | Pepe et al. .................. 455/461 |
| 5,781,614 A | * | 7/1998 | Brunson ................... 379/88.14 |
| 5,802,466 A | * | 9/1998 | Gallant et al. ............. 340/7.55 |
| 5,832,221 A | * | 11/1998 | Jones .......................... 709/206 |
| 5,889,839 A | * | 3/1999 | Beyda et al. ............. 379/88.12 |
| 5,987,100 A | * | 11/1999 | Fortman et al. ......... 379/88.14 |
| 5,995,594 A | * | 11/1999 | Shaffer et al. ........... 379/88.12 |

FOREIGN PATENT DOCUMENTS

WO 9800985 6/1997

* cited by examiner

Primary Examiner—Fan Tsang
Assistant Examiner—Roland G. Foster

(57) ABSTRACT

A system and method within a multimedia messaging system for automatically enabling the system to notify a user that his or her mailbox is full and therefore no longer accepting messages for storage. The system includes one or more mailboxes to receive and store messages from callers, a capacity calculator to determine whether the messages stored in the mailbox exceed the allotted amount of storage space and a message transmittal unit to enable one or more notification alerts to be generated in response to the capacity calculator determining that the mailbox is full.

6 Claims, 4 Drawing Sheets

NOTIFICATION SYSTEM FOR MULTIMEDIA MESSAGING SYSTEMS

BACKGROUND OF THE INVENTION

1. Field of the Invention

This invention generally relates to a messaging system and, more particularly, to a messaging system which causes notification alerts to be automatically sent to one or more destinations during predetermined conditions.

2. Description of the Prior Art

Message processing systems have been in widespread use for many years. These systems, such as a voice messaging system, facsimile servers and other multimedia messaging systems, are commonly used as message sending, receiving and storing tools. For example, voice messaging systems, commonly known as voice mail systems are configured in such systems that each user is assigned a mailbox wherein messages sent to the user are saved. The recipient of a message, upon accessing the voice mail system, may retrieve messages from his or her mailbox.

Typically, such systems allow a user to store only a certain predefined number of messages, occupy only a predetermined amount of storage space on the voice mail system or limit the amount of message time to a predetermined number of minutes. If the calls to a particular user exceed the allotted limits, the message system is, generally programmed to prevent further storage of any additional messages to the user's mailbox. Such limits protect against a single mailbox user's attempt to use more than their share of the system. In addition, the limits protect against so-called hackers that could call voice mail systems and leave lengthy messages or many small messages until the system's storage is depleted.

Generally, once a mailbox is full, subsequent callers are informed of the full mailbox condition, but are not allowed to record and save messages to the user. Furthermore, all subsequent callers are denied the opportunity to leave messages until the user deletes one or more messages from the mailbox so that storage space is once again available for new messages. Thus, a danger exists that the mailbox will become full at precisely the time the user most requires the system's message storing capabilities, for example, during a time when the user is too busy to answer telephone calls or is away from a phone, but is relying on the system to store messages during that time.

Unfortunately, in many cases, callers not only are not allowed to save messages in such a situation, but they also may have no other means of contacting the user. In such a case, the user may not even be aware of potentially important messages not being saved or accepted by the system because the user's mailbox is full. Furthermore, the user has no way of knowing that the mailbox is full until the user accesses the messaging system to check for new messages. It is only then that the user is notified and learns of the full mailbox condition, by which time many callers may have been turned away.

What is needed, therefore, is a system that allows the messaging system to automatically notify the user, through a variety of different methods, that the user's mailbox is full and therefore no longer accepting messages.

SUMMARY OF THE INVENTION

The present invention relates to a system and method for a messaging system for automatically enabling the system to notify a user that his or her mailbox is full. The messaging system includes one or more mailboxes to receive and store messages from callers. A capacity calculator is used to determine whether the messages stored in the mailbox exceed the amount of storage space allotted to the user. A message transmittal unit is used for enabling one or more notification alerts to be generated in response to the capacity calculator determining that the amount of space occupied by the messages meets or exceeds a predetermined allocated amount of storage space. An alert table may also be used to store one or more contact numbers and other information through which the user may be contacted.

DETAILED DESCRIPTION OF THE INVENTION

The present invention relates to a messaging system for example, a multimedia messaging system. Although the invention is described and illustrated with respect to a voice mail system, the principles of the present invention are applicable to other multimedia messaging systems, such as facsimile server systems. In a voice mail system, the invention is used to notify a user of the status of the user's mailbox, e.g., that their mailbox is full. User notification is achieved by enabling the messaging system to contact the user in a variety of different ways. An important aspect of the invention relates to the use of various techniques, such as facsimile, electronic mail (E-Mail), telephone call and pager call, to notify the user of a full mail box condition.

Figure 1:
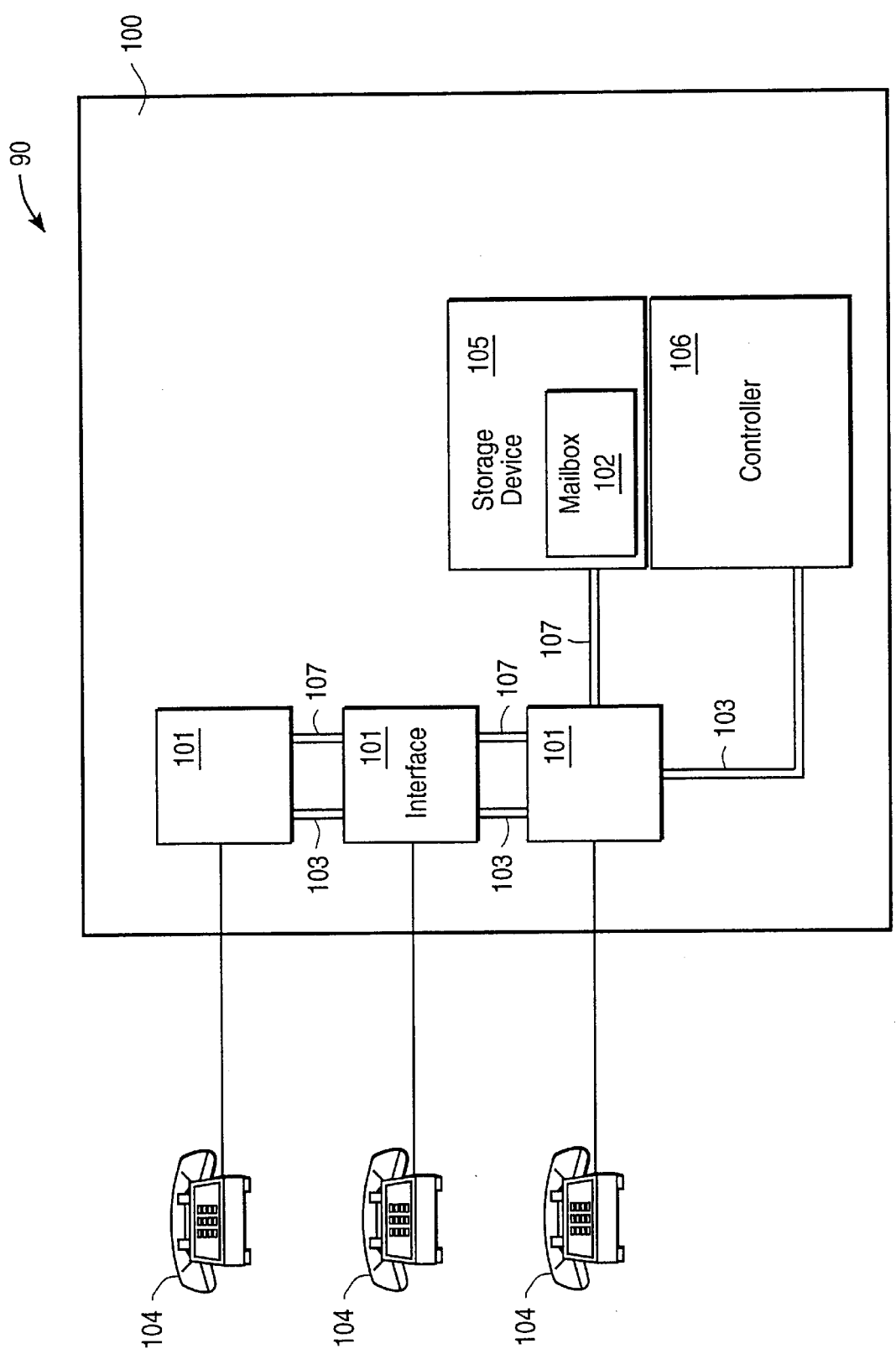
FIG. 1 is an overall block diagram of a known voice mail system.

Referring to FIG. 1, a known voice mail system VMS 90 is shown and generally includes a mail server 100 having telephone interfaces 101 and a mass storage device 105, such as a hard disk drive, having a controller 106. The mail server 100 is typically a microprocessor or microcontroller-based (not shown) control unit that controls the operation of the VMS 90 and is responsible for, among other things, controlling all of the messaging functions of the VMS 90. One or more mailboxes 102, are defined within the storage device 105, and represent portions of space reserved on the mass storage device 105 for a particular user. The amount of disk space allocated to each mailbox 102 is generally determined by a system administrator, and may typically be a function of the number of mailboxes required for all voice mail users and the amount of total system storage space available on the hard drive 105 or other storage area. Voice mail storage capacities may usually be expressed in terms of numbers of messages, minutes of messages and/or storage s pace utilization. Thus, for example, a mailbox may be limited to ten messages, thirty minutes and/or 2 MB of storage.

It is to be noted that FIG. 1 is representative of only one of many possible voice mail systems and configurations, and is therefore exemplary only. Furthermore, it should be understood that the present invention is also applicable to many other types of multimedia messaging systems including facsimile servers and other electronic message storage and retrieval systems.

Each of the telephone interfaces 101 is connected to a telephone 104. The telephone interfaces 101 are used to receive voice signals over telephone lines and to convert them to appropriate digital format for storage and later retrieval from the mass storage device 105. In addition, the telephone interfaces 101 also per form functions such as ring detection, dial signal generation, off-hook detection, etc. In operation, control signals from the telephone interfaces 101 are transmitted to the mass storage controller 106 over a control bus 103 and voice signals, which have been converted into a digital signal and using an analog-to-digital converter (not shown) are transmitted to the mass storage device 105 over a data bus 107. Typically, the telephone interfaces 101 receive voice signals, such as speech, in analog form and receive control signals and data in the form of dual tone multifrequency (DTMF) tones generated by key presses on the DTMF numeric key pad (not shown) of the telephone 104. The mail server 100 responds to the control signals to telephone interfaces 101 and the mass storage controller 106 to identify voice signals with selected addresses and stores them in the appropriate mailbox 102 on the mass storage device 105 for retrieval by the recipient or addressee at a later time.

Figure 2:
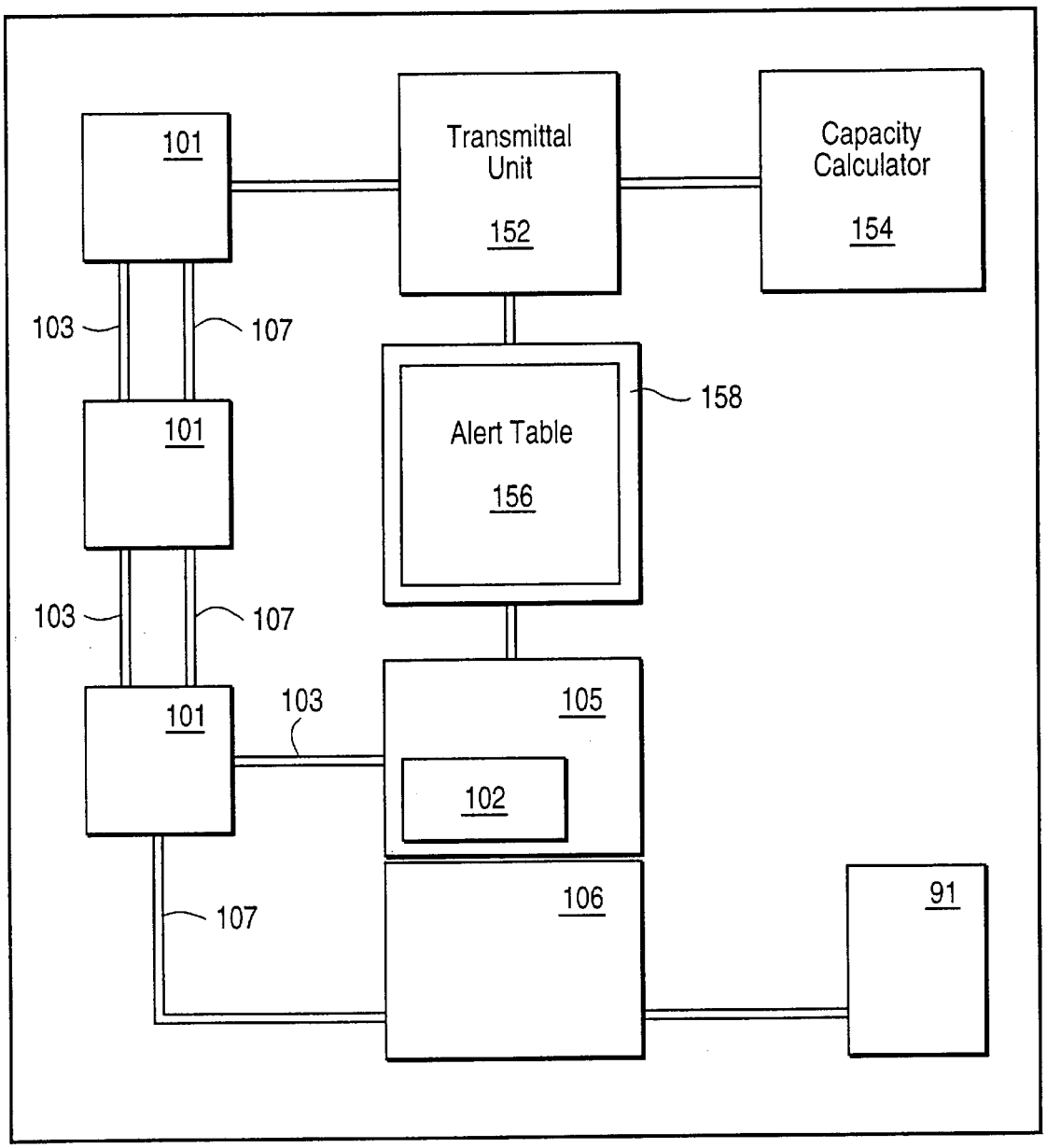
FIG. 2 is a block diagram of the voice mail system in accordance with the present invention.

Turning to FIG. 2, a block diagram of a notification system 110 which may be implemented in a VMS 90 in accordance with the preset invention is illustrated. As mentioned above, the notification system 110 enables the messaging system to alert a user that their mailbox is full using media blending to ensure that the user is notified of the situation.

In the present system, the notification system 110 includes, as will be discussed further below, a capacity calculator 154 to determine the amount of space occupied by the messages in each mailbox 102. The capacity calculator 154 further includes a message transmittal unit 152 to enable a notification message to be generated and sent in response to the capacity calculator 154 determining that the amount of space occupied by the messages exceeds a predetermined threshold. The capacity calculator 154 further may include a memory 158 in which a user alert profile table 156 stores the various items of contact information, such as E-mail address, phone number, pager number, etc. at which the user may be contacted by the messages transmittal unit 152. The above system may be interconnected by a data bus 103 and a control bus 107 and, in turn, to hard drive controller 106. The buses 103, 107 are used to carry control messages and data between the various components. The capacity calculator 154 and the message transmittal unit 152 may each be implemented as a software program or algorithm running on a microprocessor or controller (not shown). In addition, the user alert profile table 156 may optionally be a database or table on the hard drive 105 of some other non-volatile storage device.

The capacity calculator 154 determines the amount of space occupied by messages in the mailbox 102 by polling the controller 106 as to either the amount of disk or message space remaining or the amount of disk or message space used by the user's mailbox. Upon determining that the mailbox 120 is full, the capacity calculator 154 causes a flag to be set such that the voice mail system 100 enables callers to receive a mailbox full message and to refuse to store any further messages. In the present invention, the flag also causes the message transmittal unit 152 to issue a notification alert to the user that the user's mailbox is full. Depending upon the configuration of the system, the notification system 110 may use media blending techniques to initiate one or more different methods of contacting the user, as mentioned above.

The user alert profile alert table 156 is used to store the various user contact information. The user alert profile table 156, which may be stored as a table in a non-volatile memory device, such as on the hard disk 105 or in a database in a non-volatile memory device, such as flash RAM 158, enables the system to cross reference a particular user with the user's contact information. For example, the user's name may be associated with one or more voice telephone numbers, facsimile numbers, pager numbers, E-mail addresses, etc., at which the user may be contacted. The system may be programmed such that one or more of the numbers may be used in contacting the user.

Contact information for the user, which is stored in the user alert profile table 156, may be entered into the system in a number of ways. In particular, a user when setting up his or her voice mail account may be prompted by the voice mail system 100 software to input appropriate telephone numbers that may be used to contact the user. For example, known voice mail systems generally prompt the user to enter a password via the DTMF pad on the telephone for use in accessing the voice mailbox when the user is setting up his or her voice mail account for the first time. Similarly, the present invention may prompt the user to enter a voice telephone number as well. The system can also be programmed to prompt for entry of a facsimile number, pager number, etc. The information entered by the user is decoded by the telephone interface 101 which sends a command to the mass storage controller 106 to save the user entered information on the mass storage device 105 in a table or as a database entry associated with the user's extension or phone number.

Alternatively, the system administrator may enter the user's information directly into the voice mail system 100 through a standard control terminal that is generally used for system administration of the voice mail system 100.

The notification system 110 may also be used to send E-Mail messages, as mentioned above. This may be accomplished in systems where the notification system 110 is located in a voice mail system 100 that may be interfaced to a mail server in a client-server or other computer telephony integration (CTI) type environment. In particular, CTI enables the user to control telephony functions from a PC using known standards such as telephony application programming interface (TAPI) or telephony services application programming interface (TSAPI). In the above implementations, the user's E-Mail address may be entered into the system via a PC. Furthermore, voice phone number, page number and other phone numbers mentioned above may also be entered via PC.

In operation, the message transmittal unit 152, in response to the lag being set by the capacity calculator, may take one or more approaches in alerting a user, as described below. It should be noted that the notification system may be configured by the system administrator or user to implement as many or none of the following notification methods as desired. First, a message-waiting light, alphanumeric message that is typically found on most telephones interfaced to a voice mail system 100, may be programmed with an alternate cadence or message. For example, the transmittal unit 152 may cause a signal and/or message to be sent over the control bus 103 and data bus 107 to telephone interface 101 such that a digital phone having an alphanumeric display associated with the user's mailbox, may be instructed to display a message indicating that the user's mailbox is full. Furthermore, the cadence, or on-off pattern, of a message waiting light on phones equipped with such a device may be changed by the transmittal unit 152 to indicate a message full condition. For example, a message waiting light that normally blinks on and off in a slow cadence when indicating one or more waiting messages may be programmed to flash rapidly to gain the user's attention to indicate that the user's voice message mailbox is full. Similarly, the system may also provide an altered dial tone to the phone when taken off-hook. In particular, the dial tone may be changed such that it is stuttered or higher or lower in pitch. As such, a user picking up the handset hears a different dial tone, which is intended to notify the user that the mailbox is full. In addition, the transmittal unit 152 may also enable the voice mail system 100 to cause the telephone number associated with the particular full mailbox to be rung back periodically until the user responds.

Second, the transmittal unit 152 may also be used to call one or more user contact numbers as stored in the user alert profile table 156. In particular, the voice mail system 100, through a connection with the phone system or communications server (not shown), may instruct the server to outdial to the user's pager and transmit the user's telephone number for display on the pager. Similarly, the server may be programmed to outdial to a preprogrammed voice telephone number at which the user may be reached. Upon connection, the voice mail system 100 may play a stored prerecorded message informing the user that the user's voice mail mailbox is full. Furthermore, the server may also be programmed to outdial to a preprogrammed facsimile number that the user has pre-entered into the system. Upon connection, a voice mailbox full message may be transmitted.

Third, the transmittal unit 152 may also be used to enable a message to be sent to the user's E-Mail address. Upon the capacity calculator 154 determining that the user's mailbox is full, the transmittal unit may send a signal to the mail server to send a form E-Mail message to the user's E-Mail address indicating that the user's voice mail mailbox is full. It should be noted that the present invention is not limited to the notification methods described above and that other notification methods may be used as well to alert a user of a full mailbox condition.

For security reasons, the system of the present invention may be configured such that only the sender may respond to the notification message in the voice mail system. This is enforced by the voice mail system 100 at the time the user answers the notification call or uses the voice mail system 100, using commonly known and used caller identification techniques. In particular, during user log-in, the voice mail system 100 checks the electronic identification of the telephone from which the call is being placed or requires the caller to enter the extension that the caller is registered under. The voice mail system 100 then verifies the identity of the person logging into the system by requiring the user to enter a security or identification password associated with the user's extension. The code may be entered via the DTMF keypad of the telephone. The mail server 100 then cross-references the user-entered code with an existing list stored in the memory 91 in the voice mail system 100 that contains a list of all authorized users and their respective passwords. If a match is found, the system enables the user to gain further access to the functions of the voice mail system 100 and override or turn off the notification system. If no match is found, the voice mail system 100 denies further access to the system and the notification system continues to attempt to notify the user. Thus, an unauthorized or inadvertent user is prevented from turning off or cancelling the notification system.

Figure 3A:
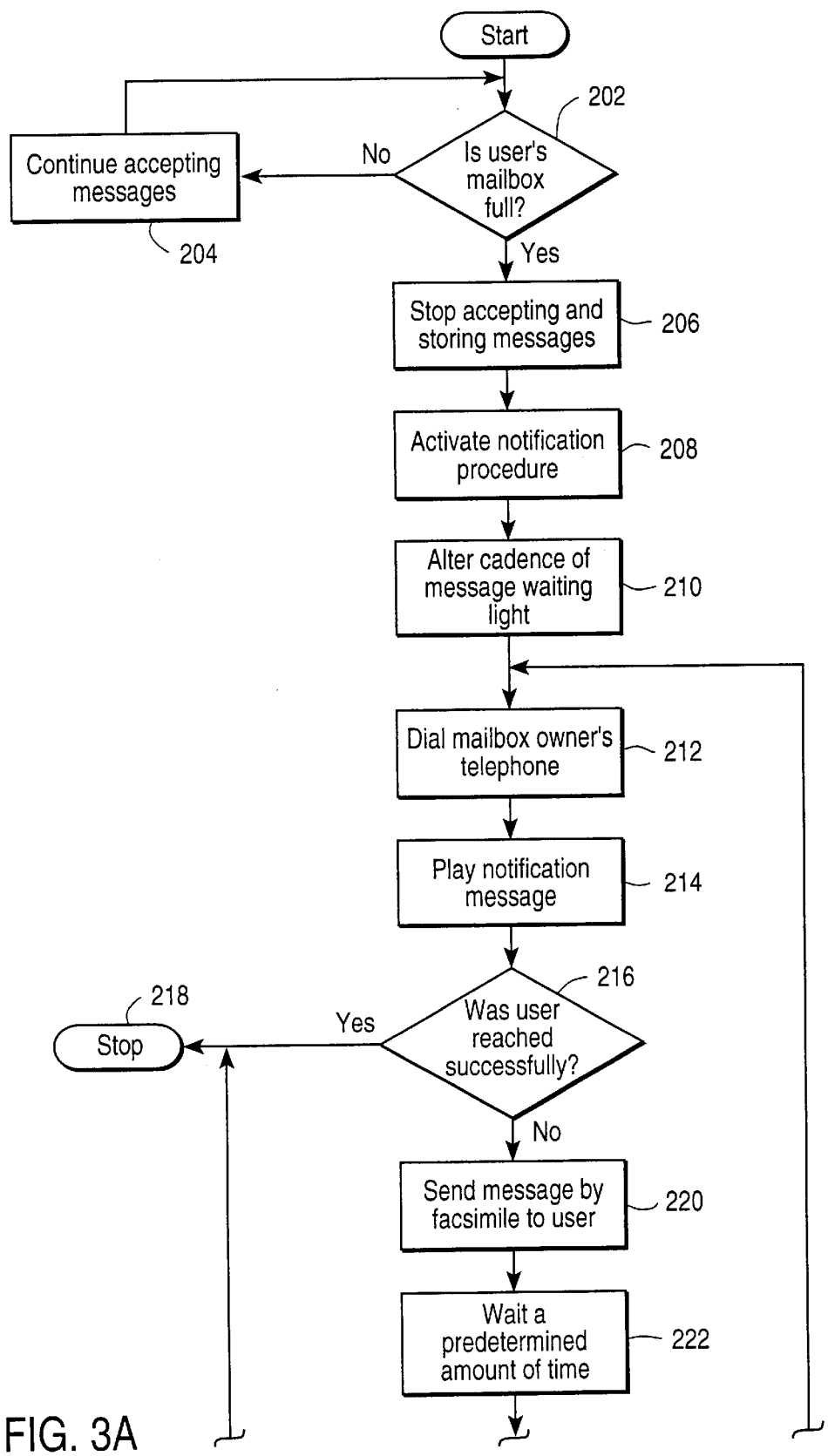
FIGS. 3A and 3B illustrate a flow diagram for generating notification messages in accordance with the present invention.
Figure 3B:
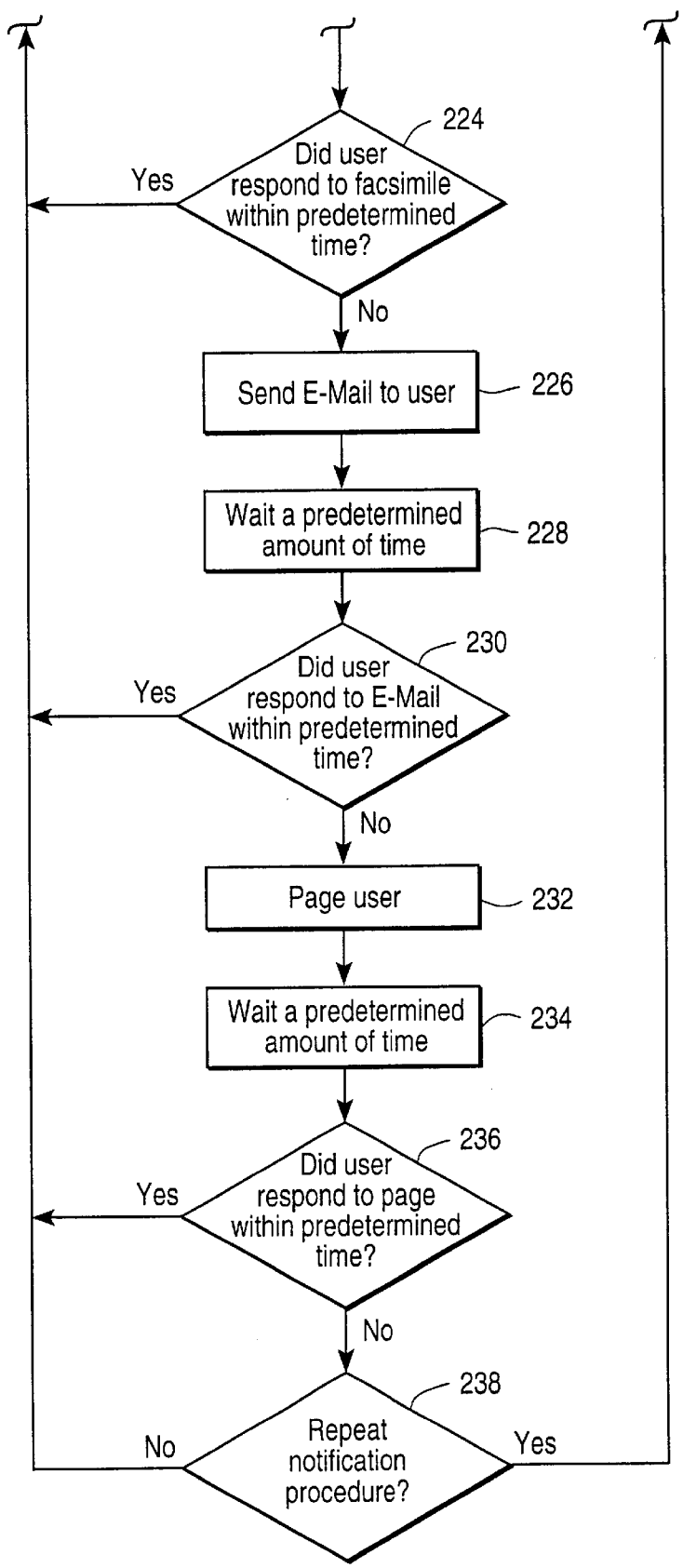

Referring to FIG. 3A and 3B, a flow diagram is shown depicting the message notification system in operation. In step 202 the system determines whether the user's mailbox is full. If the user's mailbox is not full, then in step 204 the system continues accepting messages and returns to step 202. However, if it is determined that the user's mailbox is full, then the system stops accepting and storing messages in step 206 and activates the notification system in step 208.

In step 210 the system alters the cadence of any message waiting lights that may be on the telephone. In step 212, the system dials the mailbox owner's preprogrammed telephone number. If the telephone is answered, then in step 214 the notification message is played, informing the user that the mailbox is full. In step 216 the system determines if the user was reached successfully. This is accomplished, as mentioned above, by the user entering his or her voice mail log-on password into the system via the DTMF pad on the telephone after receiving the notification message. Upon doing so, the user may gain access to their voice mail system and disable the notification system to prevent further notification messages from being transmitted to the user. The system then exits in step 218. However, if the user was not reached successfully, or an incorrect password was entered, a facsimile may be sent in step 220 to the fax number stored in the user alert profile table 156 (FIG. 2).

In step 222 the system waits a predetermined amount of time to give the user a reasonable amount of time to call the voice mail system in responding to the facsimile message recipient to call the voice mail. In step 224, the system determines whether or not the user responded, as explained above. If so, then the system returns to step 218 and exits. However, if there was no response, or an incorrect or unrecognized response, then in step 226 an E-Mail message may be sent to the user. In step 228, the system once again waits for a predetermined amount of time to enable the user to respond to the E-mail notice. The user may respond either via return E-mail if the particular system is part of a client-server multimedia messaging center or by dialing the voice mailbox and entering the voice messaging system as explained above. If the user is able to respond to the E-mail within the predetermined time, then the system exits once again, in step 218. However, if the user did not respond to the E-mail in step 230, then in step 232, the user's pager may be paged.

Once again, in step 234, the system waits a predetermined amount of time to determine whether or not the user has responded to the page. In step 236, if the user does respond within a predetermined amount of time then the system exits in step 218. However, if the user does not respond, then in step 238 the notification procedure may once again repeat at step 212. It should be noted that the system administrator may enable or disable repetition of the notification procedure as required. Furthermore, the system administrator may also enable or disable one or more of the notification methods described above.

What is claimed is:

1. A multimedia messaging system, comprising:
   a mailbox adapted to receive and store one or more messages;
   a message transmittal unit responsive to said mailbox receiving said one or more messages to enable one or more notification messages in a plurality of media formats to be generated, said one or more notification messages indicative of whether said mailbox can store any more calls; and
   a user alert table to store the one or more locations where the said one or more notification message are to be sent;
   wherein said message transmittal unit Is adapted to generate said one or more notification messages indicative of whether said mailbox can store any more calls in a plurality of media formats serially to the one or more locations if a user does not pick up at a previous one of said one or more locations.

2. The system of claim 1 wherein said one or more locations includes user contact information.

3. The system of claim 1 wherein said contact information includes one or more electronic mail addresses.

4. The system of claim 1 wherein said contact information includes one or more facsimile numbers.

5. The system of claim 4 wherein said contact information includes one or more voice telephone numbers.

6. The system of claim 1 wherein said contact information includes one or more pager numbers.

* * * * *